United States Patent
Durocher et al.

(10) Patent No.: US 7,625,415 B2
(45) Date of Patent: Dec. 1, 2009

(54) STRAINER FOR A GAS TURBINE ENGINE

(75) Inventors: Eric Durocher, Vercheres (CA); Jason Herborth, Acton (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 491 days.

(21) Appl. No.: 11/466,506

(22) Filed: Aug. 23, 2006

(65) Prior Publication Data
US 2008/0047242 A1    Feb. 28, 2008

(51) Int. Cl.
*B01D 39/00* (2006.01)
*B64B 1/24* (2006.01)
*B64B 27/00* (2006.01)

(52) U.S. Cl. ........................... 55/306; 55/336; 55/350.1; 55/385.1; 55/463; 55/521; 55/488; 55/489; 55/DIG. 17; 60/39.092; 244/53 B

(58) Field of Classification Search ................... 55/306, 55/336, 350.1, 463, 521, 488, 489, DIG. 17; 60/39.092; 244/53 B
See application file for complete search history.

(56) References Cited

U.S. PATENT DOCUMENTS

| | | | |
|---|---|---|---|
| 2,944,631 A * | 7/1960 | Kerry et al. | 55/306 |
| 3,196,598 A * | 7/1965 | Olson | 55/306 |
| 3,871,844 A * | 3/1975 | Calvin, Sr. | 55/306 |
| 4,004,760 A * | 1/1977 | Ando et al. | 244/53 B |
| 4,149,689 A * | 4/1979 | McDonald | 244/53 B |
| 4,149,974 A | 4/1979 | Bolton et al. | |
| 4,354,346 A * | 10/1982 | Wooding | 60/39.092 |
| 4,543,114 A * | 9/1985 | Beattie et al. | 55/418 |
| 5,139,673 A * | 8/1992 | Martin | 210/463 |
| 5,411,224 A * | 5/1995 | Dearman et al. | 244/53 B |
| 6,138,950 A * | 10/2000 | Wainfan et al. | 244/53 B |
| 6,821,422 B1 | 11/2004 | Brzozowski et al. | |
| 6,872,232 B1 * | 3/2005 | Pavlatos | 55/306 |
| 6,994,738 B2 * | 2/2006 | Taddey et al. | 55/306 |
| 2003/0024233 A1 * | 2/2003 | Snyder | 60/39.092 |
| 2003/0033795 A1 * | 2/2003 | Lo | 60/39.092 |
| 2005/0229558 A1 * | 10/2005 | Stelzer et al. | 55/385.3 |

* cited by examiner

*Primary Examiner*—Duane Smith
*Assistant Examiner*—Minh-Chau T Pham
(74) *Attorney, Agent, or Firm*—Ogilvy Renault

(57) ABSTRACT

The strainer comprises an unitary body having a main section and a collar section located around the main section. The collar section has a substantially outwardly-projecting portion located around the main section and an upstream projecting portion located around the substantially outwardly-projecting portion.

16 Claims, 3 Drawing Sheets

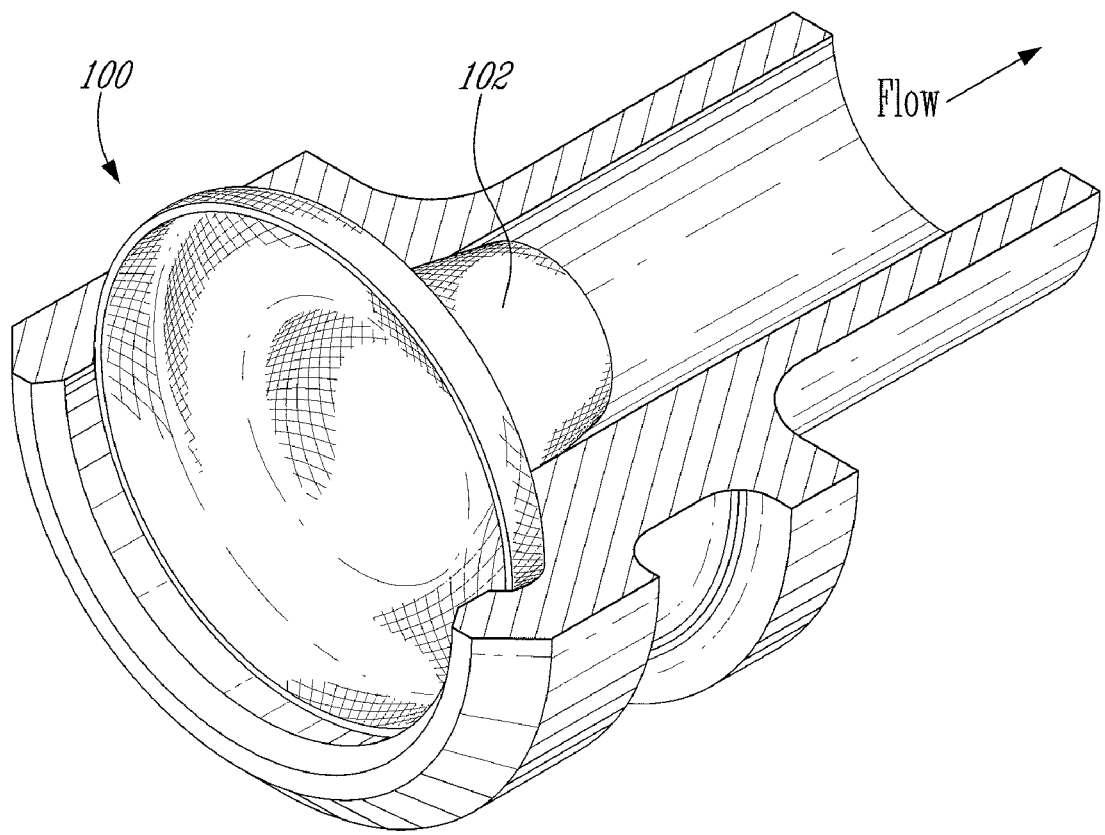
FIG_4

STRAINER FOR A GAS TURBINE ENGINE

TECHNICAL FIELD

The invention relates to a strainer, and in particular to an improved strainer for use in a gas turbine engine.

BACKGROUND

Strainers are generally used to prevent solid debris larger than a certain size that may be present in a fluid from reaching a device to which the fluid is provided. In the past, strainers used in gas turbine engines typically included a machined ring welded to a mesh. The strainers were held in their seat using a removable fastener, such as a snap ring. Strainers must maintain a leak-tight seal with their seat to prevent unfiltered fluid from by-passing them, which leak would potentially result in some solid debris reaching the device. A leak may also occur if the strainer is re-installed in its seat without the proper orientation during maintenance. Furthermore, strainers made of a plurality of parts can be complex to manufacture.

Overall, it was desirable to provide an improved strainer that is simple to manufacture and to install in its seat.

SUMMARY

In one aspect, the present concept provides a strainer for a gas turbine engine, the strainer having an upstream side and a downstream side, and comprising an unitary body having a main section and a collar section located around the main section, at least the main section being permeable to a fluid, the collar section having a substantially outwardly-projecting portion located around the main section and an upstream projecting portion located around the substantially outwardly-projecting portion.

In another aspect, the present invention provides an unitary strainer for use in a tube coupling of a gas turbine engine, the tube coupling including a conduit portion, a shoulder portion surrounding an inlet of the conduit portion, and a groove portion immediately adjacent to and upstream the shoulder portion, the strainer having a first portion being engageable against the shoulder portion, and a second portion engageable within the grooved portion when the shoulder portion and the first portion are coupled.

In a further aspect, the present invention provides a method of seating a strainer in a corresponding seat, the strainer having an unitary body, the method comprising: pushing the strainer in a downstream direction through a radial pinch and towards the seat; and abutting an outer portion of the strainer against a shoulder at a downstream side of the seat, the outer part of the strainer having an outermost portion which exerts a retaining force against the seat for locking the strainer when fully seated.

Further details of these and other aspects of the improved strainer will be apparent from the detailed description and figures included below.

BRIEF DESCRIPTION OF THE FIGURES

For a better understanding and to show more clearly how it may be carried into effect, reference will now be made by way of example to the accompanying figures, in which:

FIG. 4 is a perspective and partially cutaway view showing another example of an improved strainer.

DETAILED DESCRIPTION

Figure 1:
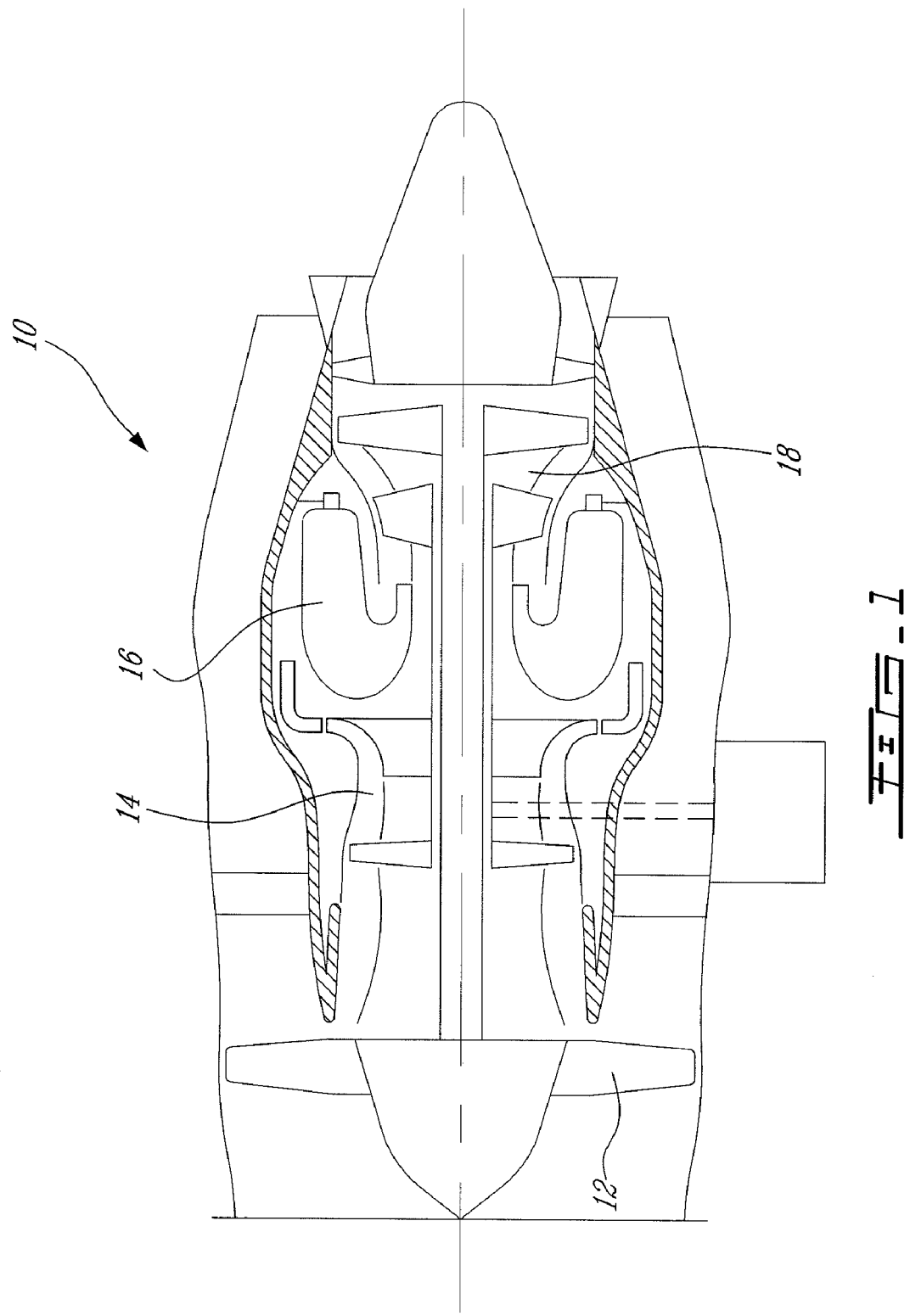
FIG. 1 schematically shows a generic gas turbine engine to illustrate an example of a general environment in which the improved strainer can be used.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. FIG. 1 only shows one example of the general environment in which the improved strainer can be used. The improved strainer can be used with other turbofan models or other kinds of gas turbine engines, such as turboprop or turboshaft engines.

Figure 2:
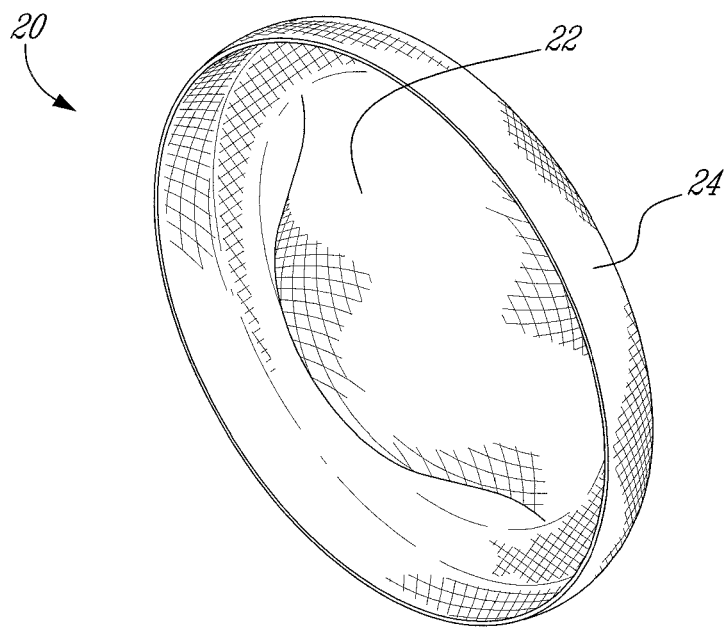
FIG. 2 is a perspective view of an example of an improved strainer.

Referring now to FIG. 2, there is shown an example of a strainer 20 as improved. This strainer 20 comprises a unitary body preferably made of the same material and that does not include any welded parts. The strainer 20 is also preferably symmetrical around a central axis.

The body comprises a main section 22 and a collar section 24 located around the main section 22. The main section 22 and the collar section 24 are concentric.

The main section 22 can be generally defined as the one through which the fluid is filtered. The flow direction is marked with the arrow in FIG. 2. The strainer 20 has an upstream side (at the left in FIG. 2) and a downstream side (at the right in FIG. 2). The main section 22 comprises a multitude of holes or apertures small enough to retain solid debris before they reach the device towards which the fluid flows, for instance a bearing when the fluid is oil or another hydraulic fluid. Preferably, the holes or apertures cover more than 50% of the total surface of the main section.

In the embodiment illustrated in FIG. 2, the main section 22 is somewhat dome-shaped and extends in direction of the upstream side, thus in the direction opposite of the flow.

The collar section 24 of the strainer 20 is seamlessly joined to the main section 22. The collar section 24 holds the strainer 20 in place when it is installed in a tube coupling. The illustrated collar section 24 comprises a substantially outwardly-extending portion 26 and an upstream projecting portion 28. The upstream projecting portion 28 of the collar section 24 preferably has an arc-shaped cross section curved of 90 degrees or more.

Figure 3:
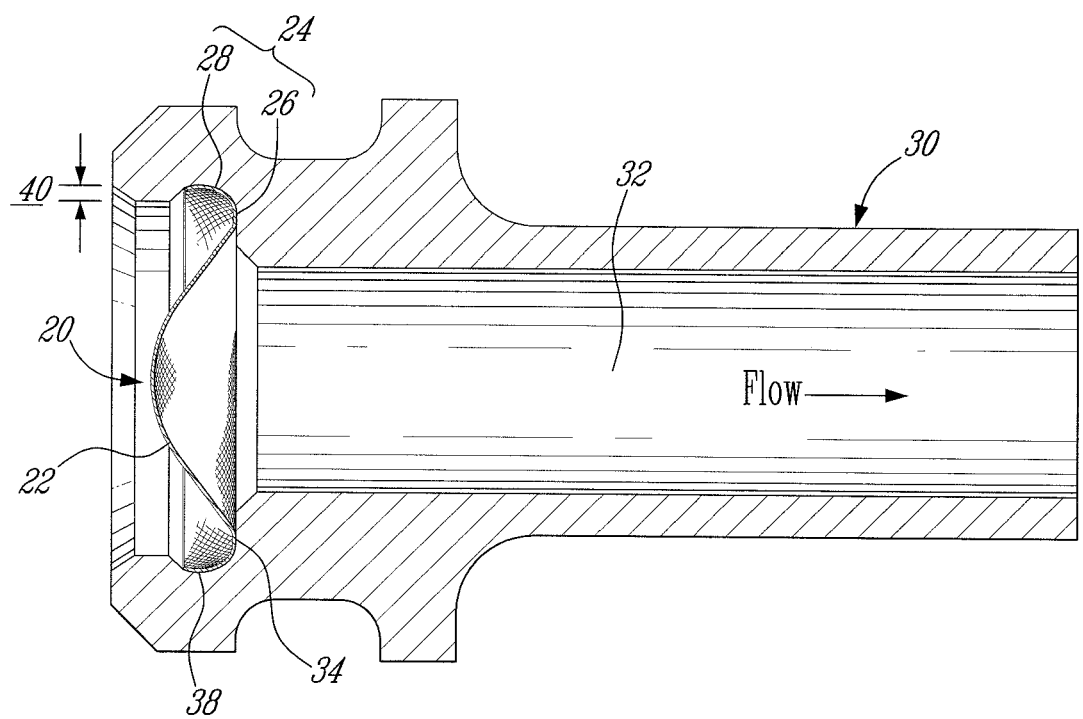
FIG. 3 is a cross-sectional view showing an example of a tube coupling in which the improved strainer of FIG. 2 is installed.

FIG. 3 shows the strainer 20 of FIG. 2 when installed in its seat in a tube coupling 30. The expression "tube coupling" generically and broadly refers to a location of the pressurized fluid circuit where a strainer can be used in a gas turbine engine. The illustrated tube coupling 30 comprises a conduit portion 32, a shoulder portion 34 surrounding the inlet 36 of the conduit portion 32 and a grooved portion 38 immediately adjacent to and upstream the shoulder portion 34. The tube coupling 30 can be located anywhere between the last potential source of solid debris and the device. Strainers are often placed very close to destination devices. However, the strainers may then be difficult to clean or replace. Placing the strainers at the inlet of ferrules outside the core of the engine 10 is one solution to alleviate the difficultly of reaching some strainers 20 located deeply in the engine 10. Thus, the portion of the tube coupling 30 illustrated in FIG. 3 is preferably a part of a ferrule.

In the illustrated embodiment, the shoulder portion 34 of the tube coupling 30 is a radially-extending surface. The grooved portion 38 preferably has an arc-shaped cross section to match that of the collar section 24 of the strainer 20. It defines a radial pinch 40 at the location immediately upstream the seat of the strainer 20, which radial pinch 40 can be defined as the difference between the radius of the front edge of the grooved portion 38 and the maximum radius of the grooved portion 38.

The strainer 20 is designed to have a tight fit of its collar section 24 in the seat of the tube coupling 30. This tight fit will assist in maintaining the strainer 20 in place without the need of a removable fastener and in maintaining the seal between the strainer 20 and its seat. This preferably consists in providing a slight interfering engagement of the strainer 20 in its seat. This way, when the strainer 20 is in place, the collar section 24 permanently applies a pressure against the grooved portion 38. The strainer 20 is designed to have the required flexibility to pass the smaller radial pinch 40 immediately upstream the grooved portion 38 during its installation.

The body of the strainer 20 can be made using a sintered wire mesh or a laser drilled metal sheet which is pre-shaped or subsequently shaped as desired. Preferably, the body has a uniform thickness to simplify the manufacturing process. However, different thicknesses of the sheet or mesh can still be provided, depending on the design. Also, the holes or apertures can be present in the collar section 24, especially when the strainer 20 is made using a prefabricated sheet or mesh.

The upstream projecting portion 28 of the collar section 24 is, as aforesaid, preferably of 90 degrees or more. This way, the foremost edge of the collar section 24 prevents the strainer 20 from toppling within its seat.

FIG. 4 shows another example of an improved strainer 100. This strainer 100 comprises a main section 102 having a larger total surface compared to the strainer 20 of FIG. 2. The main section 102 also extends in the downstream side of the strainer 100.

Overall, the strainer has many advantages. For instance, the strainer is a lightweight, low cost alternative to current strainers using gas turbine engines. It can also be used without modification to existing hardware or the overall size location of the strainer support hardware.

The above description is meant to be exemplary only, and one skilled in the art will recognize that other changes may also be made to the embodiments described without departing from the scope of the invention disclosed as defined by the appended claims. For instance, the present invention is not limited to a hydraulic fluid used with bearings. The strainer can be used with other fluids, such as fuel or even a gas. The strainers can be located upstream another kind of device, such us a pump, a valve, etc. The strainers can have a different shape than the two models illustrated herein. For instance, the shape of the main section can vary greatly from what is shown. The shape of the collar section can also vary greatly. For instance, the upstream projecting portion of the collar section can have a substantially square-shaped cross section or have another non arc-shaped cross section. Depending on the design requirements, one or more welded parts can nevertheless be provided on the simplified basic design. The strainers are not necessarily symmetrical around the central axis. For instance, some strainers can be somewhat oval. Also, the outer part of the collar section can have slots or have other discontinuities in order to facilitate the insertion of the strainer through the radial pinch. The tube coupling can be different from what is shown in FIG. 3. Still other modifications which fall within the scope of the present invention will be apparent to those skilled in the art, in light of a review of this disclosure, and such modifications are intended to fall within the appended claims.

What is claimed is:

1. A strainer for a gas turbine engine, the strainer having an upstream side and a downstream side, and comprising an unitary body having a main section and a collar section located around the main section, at least the main section being permeable to a fluid, the collar section having a substantially outwardly-projecting portion located around the main section and an upstream projecting portion located around the substantially outwardly-projecting portion, the upstream projecting portion being located outwardly from the outwardly-projecting portion.

2. The strainer as defined in claim 1, wherein the strainer is symmetrical around a central axis.

3. The strainer as defined in claim 1, wherein the strainer is devoid of welded parts.

4. The strainer as defined in claim 1, wherein the body has a substantially uniform thickness.

5. The strainer as defined in claim 1, wherein the strainer is located in a ferrule.

6. The strainer as defined in claim 1, wherein the main section extends in the downstream side.

7. The strainer as defined in claim 1, wherein the main section is dome-shaped and extends in the upstream side.

8. The strainer as defined in claim 1, wherein the body is at least partially made of a sintered wire mesh.

9. The strainer as defined in claim 1, wherein the body is at least partially made of a laser drilled metal sheet.

10. The strainer as defined in claim 1, wherein the fluid includes hydraulic fluid, the strainer having holes or apertures in the main section that cover more than 50% of a total surface of the main section.

11. The strainer as defined in claim 1, wherein the collar section has an arc-shaped cross section.

12. The strainer as defined in claim 11, wherein the arc-shaped cross section of the collar section is curved of at least 90 degrees.

13. An unitary strainer for use in a tube coupling of a gas turbine engine, the tube coupling including a conduit portion, a shoulder portion surrounding an inlet of the conduit portion and extending radially with respect to the inlet, and a groove portion immediately adjacent to and upstream of the shoulder portion, the strainer having a first portion being engageable against the shoulder portion, and a second portion engageable within the grooved portion when the shoulder portion and the first portion are coupled.

14. The strainer as defined in claim 13, wherein the second portion is substantially arc shaped.

15. The strainer as defined in claim 14, wherein the second portion has an outer diameter larger than an inner diameter of the grooved portion, the grooved portion being substantially annular.

16. A method of seating a strainer in a corresponding seat, the strainer having an unitary body, the method comprising:
   pushing the strainer in a downstream direction through a radial pinch and towards the seat;
   abutting an outer portion of the strainer against a shoulder at a downstream side of the seat;
   interferingly engaging the outer part of the strainer into a groove of the seat, the strainer having an outermost portion which exerts a retaining force against the groove of the seat for locking the strainer when fully seated.

* * * * *